Feb. 21, 1967 B. DIAZ 3,305,152

TAPE DRIVE MECHANISM

Filed Feb. 26, 1965 2 Sheets-Sheet 1

INVENTOR
BEN DIAZ

BY Edward M. Farrell

ATTORNEY

United States Patent Office 3,305,152
Patented Feb. 21, 1967

1 2

3,305,152
TAPE DRIVE MECHANISM

Ben Diaz, Sewell, N.J., assignor to Sperry Rand Corporation, New York, N.Y., a corporation of Delaware
Filed Feb. 26, 1965, Ser. No. 435,527
4 Claims. (Cl. 226—188)

This invention relates to tape drive mechanisms, and more particularly to tape drive mechanisms for driving magnetic tape in either of two directions.

Driving magnetic tape by means of rotating capstans engaging the tape is well known. In some cases, sources of low or high pressure are applied to the capstan to either draw the tape into physical engagement with the capstan when the tape is to be driven or to repel the tape away from the capstan when the tape is not to be driven. A pair of counter-rotating capstans are generally employed to drive the tape in either direction. Other means for driving tape have included continuously rotating capstans wherein a pressure roller is actuated to engage the tape and to push it against the capstan causing the tape to be moved.

While the use of different pressure levels with capstans have been generally acceptable, they are often expensive and therefore not suitable for low cost tape transport systems. The use of pressure rollers which are actuated to abruptly engage continuously rotating capstans often create problems. These problems include tape slippage, damage to the tape resulting from the abrupt contact by the pressure or pinch roller and the non-uniformity of the acceleration between the tape and the capstan.

It is an object of this invention to provide an improved tape drive mechanism.

It is a further object of this invention to provide an improved capstan tape drive wherein tape is accelerated at substantially the same rate as a driving capstan.

It is still a further object of this invention to provide an improved tape drive mechanism in which slippage and wearing of the tape is minimized.

In accordance with the present invention, a tape drive mechanism is provided. A pressure roller is disposed to disengage or to engage the tape in rolling engagement with a normally non-rotating capstan. A first relay is provided for actuating a pressure roller to rollingly engage the tape with the capstan prior to rotation of the capstan. The driving mechanism for the capstan includes a capstan drive wheel and a friction wheel in continuous engagement with each other and adapted to be moved as a single unit. A continuously driven roller is normally out of engagement with the friction wheel. A second relay is actuated to cause the friction roller to engage the continuously driven roller thereby driving the capstan to move the tape after the pressure roller has moved the tape into engagement with the capstan. Upon release of the second relay, the friction roller drops out of engagement with the continuously driven roller to engage a brake element to stop the capstan.

Other objects and advantages of the present invention will be apparent and suggest themselves to those skilled in the art, from a reading of the following specification and claims, in conjunction with the accompanying drawing in which:

Figure 1:
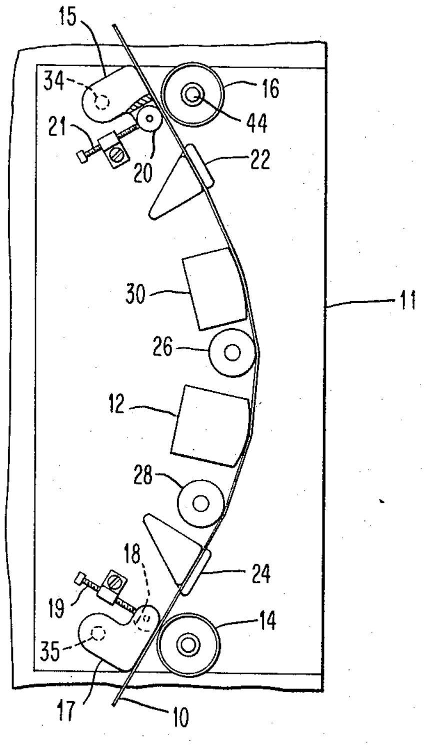
FIGURE 1 is a partial front view of a tape drive mechanism embodying the present invention.

Referring particularly to FIGURE 1, a tape drive unit includes a front plate 11 on which a magnetic tape 10 is disposed to ride over a magnetic head 12, which performs a reading or writing operation in a well known manner. The tape 10 is fed from a supply reel to a take-up reel not illustrated, which are driven by motors. Such motors and driving means are well-known to those skilled in the art and not directly related to the present invention.

A pair of capstans 14 and 16, adapted to be rotated in opposite directions, are provided so that the tape 10 may be driven in either of two directions. As will be described, capstans 14 and 16 are normally in inoperative conditions out of engagement with pressure rollers 18 and 20, respectively. The rollers 18 and 20 are mounted for rotation on pivot arms 15 and 17. The arms 15 and 17 may be pivoted about shafts 34 and 35 to cause the rollers to engage or disengage the tape, as will be described. When the tape is to be driven, one of the pressure rollers 18 or 20 is actuated to engage its respective capstan 14 or 16, respectively. When a pressure roller engages its respective capstan, the capstan is driven to drive the tape in the selected direction. Screws 19 and 21, suitably mounted, are adjustable to permit adjustment of the distances between the rollers and the capstans when the rollers are retracted away from the tape.

Guide members 22 and 24 are provided to guide the tape 10 as it is moved during operation. A pair of rollers 26 and 28 are also provided. The surface of the tape may be cleaned by a cleaning element 30 during operation. This cleaning element may be in the form of a scraper or other suitable forms. Except for the rotating capstans and pressure rollers mentioned, the elements illustrated in FIGURE 1 are only incidentially related to the present invention.

Figure 2:
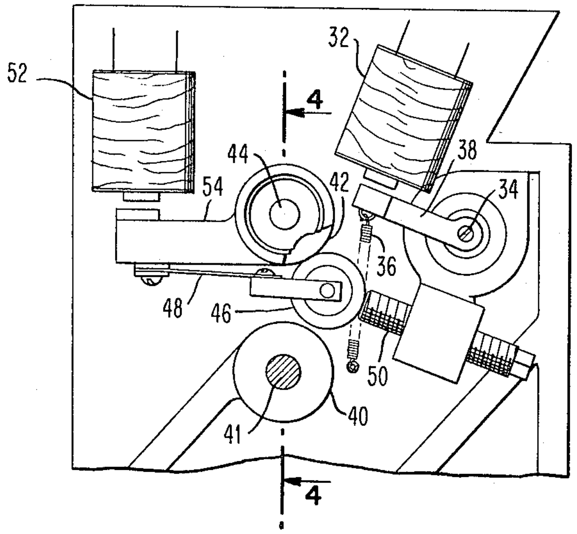
FIGURE 2 is a partial rear view of a tape drive mechanism embodying the present invention in which one condition of operation is illustrated.

Referring particularly to FIGURE 2, the mechanism associated with the capstan 16 and the pressure roller 20 will be described, it being understood that a substantially similar mechanism will be associated with the capstan 14 and the pressure roller 20. The view of this figure is from the opposite side of the front plate 11 than the view of FIGURE 1.

As previously mentioned, the capstans 14 and 16 are normally in a stationary position until they are selectively driven by means to be described. Prior to the rotation of either of the capstans 14 and 16, one of the associated pressure rollers 18 or 20 is first brought into engagement to drive the tape against its associated capstan 14 or 16. This operation is performed when the capstans are not rotating. This arrangement helps to avoid slippage or damage to the tape when the pressure roller is brought into engagement to drive the tape against the capstan, as often occurs when the capstan is already rotating when the pressure roller is actuated. The arrangement also permits a pressure roller and its associated capstan to be accelerated at substantially the same rate without undue tape slippage.

Considering only the mechanism associated with the capstan 16, when it is desired to drive the tape 10 in a predetermined direction, the pressure roller 20 must be brought into engagement with the tape 10 to press it against the capstan 16. To accomplish this, an electrical signal is applied to actuate a relay 32, which in turn actuates an arm 38 to cause a slight angular rotation of a shaft 34. As illustrated in FIGURE 1, the shaft 34 actuates the arm 15 which causes the pressure roller 20 to be rotated at a slight angle about the axis of the shaft 34 bringing it into engagement with the tape 10. At this point, the tape 10 is pressed against the capstan 16.

Figure 3:
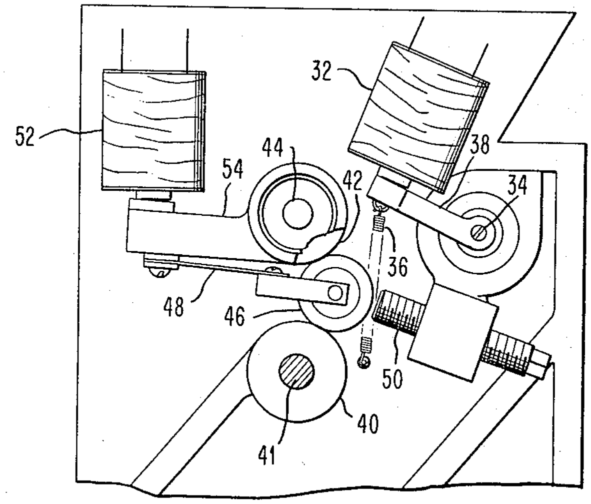
FIGURE 3 is a view similar to FIGURE 2 in which a different condition of operation is illustrated.

When no signal is applied to the relay 32, a spring 36 normally biases the arm 38 to keep the shaft 34 in a position such that the roller 20 is disengaged from the capstan 16. It is therefore seen that before the capstan 16 is driven, the roller 20 is brought into engagement with the tape to press it against the capstan 16. After the roller 20 is positioned to press the tape against the capstan 16, the means for driving the capstan 16 is actuated. FIGURE 3 illustrates the operative condition of operation wherein the arm 38 is drawn towards the relay 32.

The mechanism for driving the capstan 16 includes a fly wheel drive roller 40 which is continuously driven. A capstan drive roller 42 is connected to drive a shaft 44, which in turn is connected to drive the capstan 16 (FIGURE 1). When the capstan drive roller 42 is driven, the shaft 44 is also driven to move the capstan 16. A friction roller 46 is disposed to continuously engage the capstan roller 42. An arm 54, adapted to be moved about the axis of the shaft 44, is connected to the capstan drive roller and a spring 48. The friction roller 46 is biased against the capstan drive roller 42 by means of the spring 48. Both the capstan drive roller 42 and friction roller 46 are connected to be moved as a single unit about a pivot axis provided by the shaft 44.

In the position illustrated in FIGURE 2, the mechanism is illustrated as being in an inoperative position, i.e., the capstan 16 is not driven by the shaft 44 and the roller 20 is not in active engagement to press the tape against the capstan 16. In this position, the friction roller 46 engages an adjustable screw element 50, which acts as to prevent rotation of the friction wheel 46. Because of the friction produced by the friction wheel 46 against the screw element 50, the capstan drive roller 42 is also held in a stationary position.

When a signal is applied to a relay 52, the arm 54 is rotated about the axis of the shaft 44. When this occurs, the friction roller 46, rotating about the axis of the shaft 44, moves in a clockwise direction to disengage the screw element 50 to contact the drive roller 40.

As mentioned, FIGURES 2 and 3 are similar except that FIGURE 2 illustrates an inoperative condition and FIGURE 3 illustrates an operative condition.

As illustrated in FIGURE 3, it has already been mentioned that the pressure roller 20 is first actuated before the capstan 16 is driven. This condition is caused by the arm 38 being drawn towards the relay 32. Subsequent to this, the drive roller 40 is brought into engagement with the friction wheel 46. The capstan roller 42 is then driven to drive the shaft 44, which in turn, rotates the capstan 16.

Figure 4:
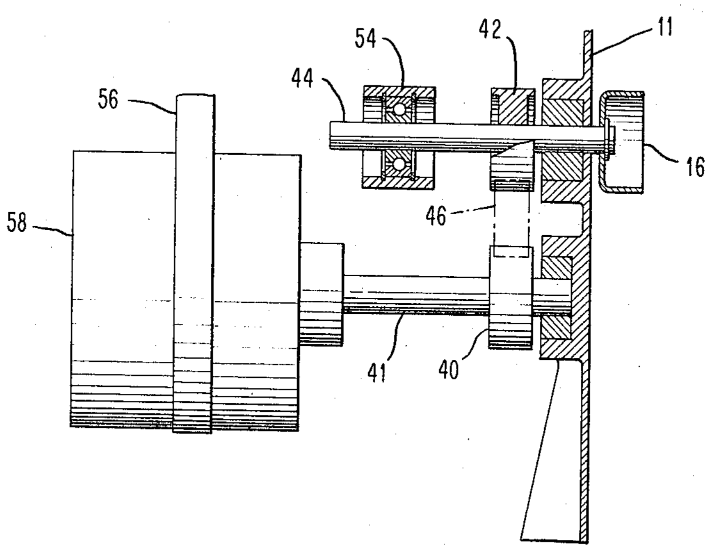
FIGURE 4 is a cross-sectional view taken along lines 4—4 of FIGURE 2.

Referring particularly to FIGURE 4, the means for driving the drive wheel 40 is illustrated. These means may include a belt 56 adapted to be driven by a motor not illustrated. The belt 56 drives the roller 58 which in turn causes rotation of a shaft 41 which drives the wheel 40.

There has thus been described a relatively simple tape drive mechanism in which the tape is accelerated at the same rate as the driving capstan. This is accomplished with a minimum of tape slippage and wtih a minimum of wear of the tape when a pressure roller is brought into engagement to press the tape against the capstan.

The embodiments of the invention in which an exclusive property or privilege is claimed are defined as follows:

1. A tape drive mechanism comprising a capstan for receiving said tape, said capstan including a shaft element extending therefrom, a pressure roller disposed to selectively disengage said tape or to engage said tape in rolling engagement with said capstan, a continuously rotatable drive roller, a capstan roller connected to said shaft element, an intermediate friction roller in continuous engagement with said capstan roller and normally disengaging said continuously rotatable drive roller, a relay for actuating said pressure roller to press said tape into rolling engagement with said capstan, and a second relay for actuating said friction roller to engage said continuously rotatable drive roller to drive said capstan to move said tape after said pressure roller is actuated.

2. A tape drive mechanism comprising a capstan for receiving said tape, said capstan including a shaft element extending therefrom, a pressure roller normally spaced from said capstan to prevent said tape from being driven by said capstan, a first relay for selectively actuating said pressure roller to press said tape into rolling engagement with said capstan, a continuously rotatable drive roller, a motor for driving said continuously rotatable drive roller, a capstan roller connected to said shaft element, an intermediate friction roller in continuous engagement with said capstan roller and normally disengaging said continuously rotatable drive roller, and a second relay for selectively actuating said friction roller to engage said continuously rotatable drive roller to drive said capstan to move said tape after said pressure is actuated.

3. A tape drive mechanism comprising a capstan for receiving said tape, said capstan including a shaft element extending therefrom, a pressure roller disposed to selectively disengage said tape or to engage said tape in rolling engagement with said capstan, a continuously rotatable drive roller, a capstan roller connected to said shaft element, an intermediate friction roller in continuous engagement with said capstan roller and normally disengaging said continuously rotatable drive roller, a spring element for maintaining said friction and capstan rollers in engagement with each other, an arm element connected to said capstan roller and receiving said spring to permit said friction and capstan rollers to be moved as a single unit, said arm element being connected to said shaft of said capstan, a relay for actuating said pressure roller to press said tape in rolling engagement with said capstan, a second relay for actuating said arm element to cause said friction and capstan rollers to be moved about the axis of said shaft to cause said friction roller to engage said continuously rotatable drive roller to drive said capstan to move said tape after said pressure roller is actuated, and a brake element for engaging said friction roller when said arm element is not actuated by said second relay.

4. A tape drive mechanism comprising a front plate separating a front area from a back area, said front area including a capstan and a pressure roller, said capstan being provided to receive said tape, said capstan including a shaft element extending therefrom from said front area through said front plate to said rear area, said pressure roller being disposed to selectively disengage said tape or to engage said tape in rolling engagement with said capstan, said rear area including a continuously rotatable drive roller, a capstan roller connected to said shaft element and an intermediate friction roller in continuous engagement with said capstan roller and normally disengaging said continuously rotatable drive roller, a spring element for maintaining said friction and capstan rollers in engagement with each other, a first arm element, means for connecting said first arm element to said pressure roller from said front area to said rear area through said front plate, a second arm element connected to said capstan roller and receiving said spring element to permit said friction and capstan rollers to be moved as a single unit, said second arm element being connected to said shaft of said capstan, a first relay for actuaing said first arm element to move said pressure roller to press said tape in rolling engagement with said capstan, and a second relay for actuating said second arm element to cause said friction and capstan rollers to be moved about the axis of said shaft to cause said friction roller to engage said continuously rotatable drive roller to drive said capstan to move said tape after said pressure roller is actuated, and an adjustable screw element for braking said friction roller when said arm element is not actuated by said second relay.

References Cited by the Examiner

UNITED STATES PATENTS

| | | | |
|---|---|---|---|
| 2,823,546 | 2/1958 | Barrett | 74—206 X |
| 2,828,961 | 4/1958 | Rehklau | 226—176 |
| 3,141,593 | 7/1964 | Selsted et al. | 226—176 X |
| 3,164,331 | 1/1965 | Hardy | 226—176 X |
| 3,176,895 | 4/1965 | Kurth | 226—176 |

ROBERT B. REEVES, *Primary Examiner.*

N. L. STACK, *Assistant Examiner.*